US006772790B2

(12) United States Patent
Viebahn et al.

(10) Patent No.: US 6,772,790 B2
(45) Date of Patent: Aug. 10, 2004

(54) FUEL TANK

(75) Inventors: Reiner Viebahn, Wachtberg (DE); Christoph Adams, Bonn (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 234 days.

(21) Appl. No.: 10/090,463

(22) Filed: Mar. 4, 2002

(65) Prior Publication Data

US 2002/0148660 A1 Oct. 17, 2002

(30) Foreign Application Priority Data

Mar. 2, 2001 (DE) .......................................... 101 10 189

(51) Int. Cl.[7] .............................................. F16K 17/26
(52) U.S. Cl. ................ 137/592; 137/493.3; 137/493.9; 137/512.2; 137/512.3
(58) Field of Search .............................. 137/493, 493.3, 137/493.4, 493.9, 512, 512.2, 512.3, 587, 588, 592

(56) References Cited

U.S. PATENT DOCUMENTS

| 3,866,638 A | | 2/1975 | Mingus et al. ............... 141/352 |
|---|---|---|---|
| 3,939,866 A | * | 2/1976 | Pignatelli .................. 137/493.4 |
| 5,117,860 A | * | 6/1992 | Horner, Jr. ............. 137/512.21 |
| 5,439,129 A | * | 8/1995 | Buechler ..................... 137/587 |
| 5,730,194 A | * | 3/1998 | Foltz .......................... 137/588 |
| 6,000,426 A | | 12/1999 | Tuckey et al. .............. 137/588 |
| 6,026,848 A | * | 2/2000 | Huynh ..................... 137/493.9 |
| 6,056,029 A | * | 5/2000 | Devall et al. ............ 137/493.4 |
| 6,234,195 B1 | * | 5/2001 | Kippe et al. ................ 137/588 |

FOREIGN PATENT DOCUMENTS

| DE | 41 09 337 A1 | 10/1991 | .......... B60K/15/04 |
|---|---|---|---|
| EP | 0 714 800 A1 | 6/1996 | .......... B60K/15/04 |
| FR | 2 761 974 A1 | 10/1998 | .......... B67D/5/377 |
| WO | WO 00/ 32431 | 6/2000 | .......... B60K/15/04 |

* cited by examiner

*Primary Examiner*—John Rivell
(74) *Attorney, Agent, or Firm*—Grossman Tucker Perreault & Pfleger, PLLC

(57) ABSTRACT

A fuel tank for a motor vehicle has means for delivering fuel from the tank to the engine, means for the introduction of air into and the venting of air from the tank, and a filler pipe which can be closed at its intake end and which at its outlet end into the interior of the tank has at least one valve which can sealingly close at least upon a blowback of fuel thereto. At least one second valve is disposed in the filler pipe in the region of the outlet end thereof. The first valve in the filler pipe can be bridged by way of the second valve.

22 Claims, 6 Drawing Sheets

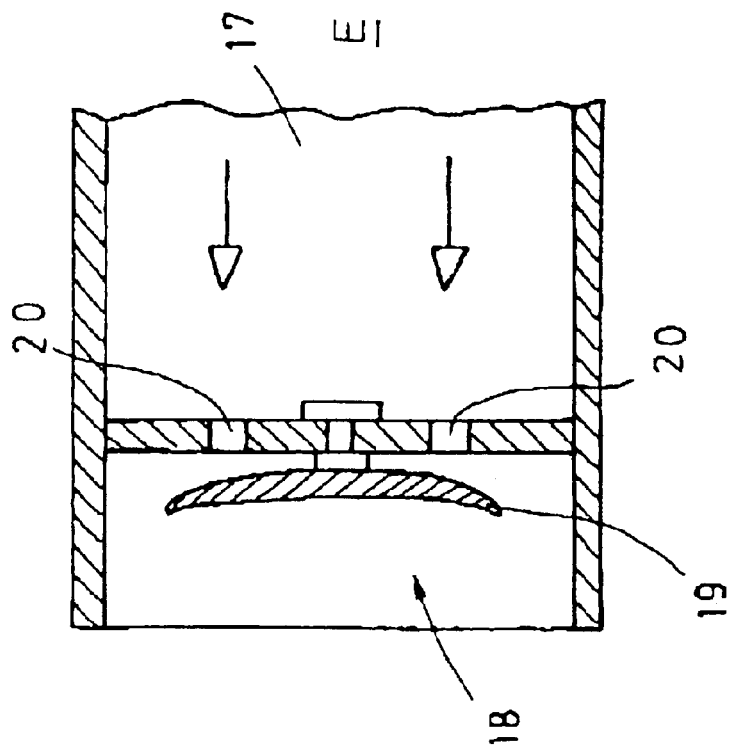
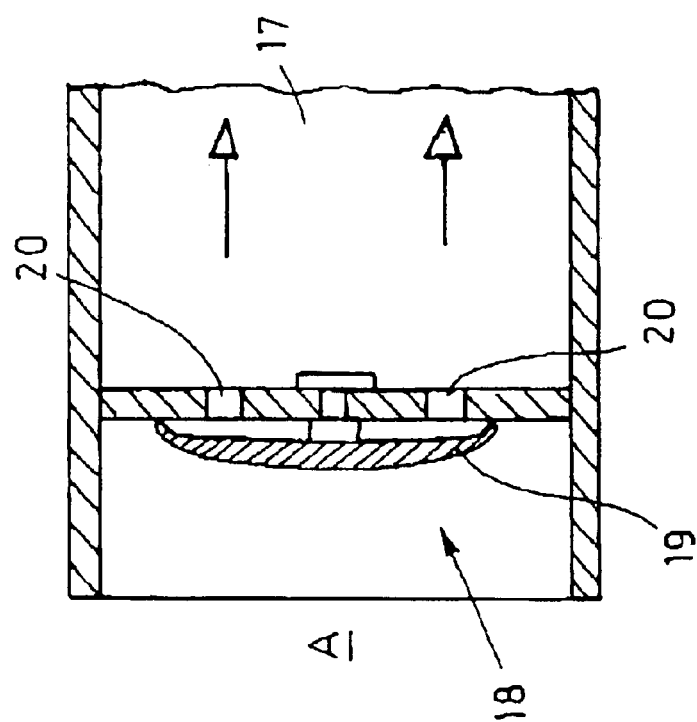

FUEL TANK

FIELD OF THE INVENTION

The invention concerns a fuel tank and more particularly a fuel tank suitable for a motor vehicle.

BACKGROUND OF THE INVENTION

A typical form of fuel tank, for example for a motor vehicle, includes means for delivering the fuel tank from the internal volume of the tank to the engine, and means for the introduction of air into and the venting of air from the tank. The tank further includes a filler pipe which is closable at the intake end and which, in the region of its mouth opening into the interior of the tank, that is to say at the outlet end of the filler pipe, is provided with at least one first valve which is operable to sealingly close off at least when there is a surge of fuel back into the filler pipe, which will be referred to as fuel blowback.

Modern fuel tanks and fuel delivery systems in particular for motor vehicles are being subjected to ever increasing demands in terms of sealing integrity thereof. On the one hand, continuous hydrocarbon emissions arising due to diffusion or very minor leakage are to be avoided, while on the other hand both when filling the motor vehicle tank and also in the event for example of an accident, the aim is to guarantee that liquid or gaseous hydrocarbons cannot escape from the tank. For example in the event of the motor vehicle in which the tank is fitted turning over, or in the event of the tank filler pipe being torn away as a result of impact, it is still necessary to ensure that the fuel tank is still sealingly closed off. Not least, at the end of a tank filling procedure, it is also necessary to ensure that no fuel can splash or slop back out of the tank. It will be noted that, when a tank is being filled with a refuelling nozzle, up to 60 liters of fuel per minute can be fed to the fuel tank, depending on the design configuration of the refuelling pump, so that, depending on the configuration of the filler pipe involved, it would be possible, without special measures being taken, for fuel to suffer a surge back in the filler pipe, particularly when the fuel is diesel fuel which has a severe tendency to foam up.

For that reason the outlet end of the filler pipe of a fuel tank has been provided with a check or non-return valve or check flap member, operable for sealingly closing off the fuel tank, in other words, the check valve is only opened in a motor vehicle tank filling procedure, by virtue of the fuel flowing into the tank.

Finally, it is known for the sealing integrity of the fuel tank to be continuously checked during operation of the motor vehicle and for any lack of sealing integrity to be displayed, for example by means of an on-board computer. Such OBD-functions (on-board diagnosis) also include for example checking whether the fuel cap has been fitted to the tank and/or locked. Sealing integrity of a fuel tank is usually checked by subjecting the tank to a reduced pressure therein. When check valves which close with a sealing action are used in the filler pipe of the fuel tank, such a sealing integrity checking operation can only be carried out for the main volume of the fuel tank, without involving complicated and expensive by-pass lines, but it cannot also be implemented in respect of the filler pipe, which however would be desirable. A further disadvantage of such an arrangement is that an emergency valve for venting the tank in the event of an unacceptable increase in pressure occurring therein, for example due to the severe action of heat thereon, cannot be implemented by way of the fuel cap or cover closure of the filler pipe. It is therefore necessary for such a valve to be provided in the actual wall of the fuel tank, but that entails the disadvantage that this can increase the fuel tank emission values. Furthermore that will also increase the fuel tank manufacturing cost.

SUMMARY OF THE INVENTION

An object of the present invention is to provide a fuel tank for example for a motor vehicle, which can avoid the disadvantages referred to herein before.

Another object of the present invention is to provide a motor vehicle fuel tank so designed as to permit the implementation of a checking procedure for sealing integrity of a filler pipe of the tank as well as emergency venting of the tank, using a structurally simple tank configuration.

In accordance with the principles of the present invention the foregoing and other objects are attained by a fuel tank, as for a motor vehicle, comprising means for delivering fuel from the tank to an engine, and means for the introduction of air into and the venting of air from the tank. The fuel tank has a filler pipe which is closable at its intake end and which in the region of the mouth opening thereof into the interior of the tank, at the outlet end of the filler pipe, includes at least one first valve which sealingly closes off at least in the event of a fuel blowback. The fuel tank further includes at least one second valve which is disposed in the filler pipe in the region of the outlet end thereof, wherein the first valve can be bridged over by the second valve.

As will be apparent from the description hereinafter of a preferred embodiment of the invention a fuel tank in accordance with the present invention means that it is possible to run a check on the sealing integrity of the filler pipe and also to carry out emergency venting of the fuel tank, using structural means which are comparatively simple. There is also no need to lay relatively long by-pass conduits nor is there any requirement for one or more valves to be additionally disposed in the wall of the tank.

In accordance with a preferred feature of the invention the second valve is in the form of a valve which is operable to open and close in the same direction with the first valve and which is adapted upon actuation to respond to a lower actuating force than the second valve. In that way, the second valve opens when the fuel tank is subjected to a reduced pressure therewithin in the usual fashion, whereby a measuring procedure involving the production of a reduced pressure within the tank for testing, same can also involve the region of the filler pipe, without the sealing integrity of the system generally being adversely affected.

In a further preferred feature the second valve can be disposed in a valve body of the first valve. That can advantageously combine a number of functionalities in one structural unit, occupying a small amount of space.

A further preferred feature provides that the first valve is in the form of a spring-loaded non-return or check valve.

The second valve can be in the form of a resilient disk or plate member which when not actuated closes at least one passage in the valve body of the first valve. That can close the passage or passages, with a comparatively small amount of force, as it is to be assumed in any case that there is an increased pressure in the interior of the fuel tank, in the operative condition.

In a preferred feature of the invention, the second valve can be so designed for example that it is openable at a differential pressure with a fall to the interior of the tank of between about 5 and 20 mbars. Usually, in a procedure for checking the sealing integrity of a fuel tank by means of producing a reduced pressure therein, differential pressures of about 25 mbars are involved. It is at any event necessary to ensure that the second valve opens at a differential pressure value markedly below the testing differential pressure.

In an alternative configuration of the valve in accordance with the invention the second valve can be in the form of a safety valve which opens and closes in the opposite direction to the first valve.

The second valve can be for example in the form of a spring-loaded valve, while the second valve may have a valve body which is in the form of a sealing seat for the valve body of the first valve.

Preferably, the valve bodies of the first and second valves are arranged in a common valve housing whereby the valve arrangement according to the invention is particularly compact.

Preferably, the valve body of the second valve can be of an annular configuration and in the closed condition seals off an annular space or bypass between the valve body of the first valve and the valve housing. The valve body of the first valve can at least in the closure position engage into or pass through the valve body of the second valve.

In accordance with another preferred feature of the invention the second valve is in the form of a valve which is operable to open and close in the same direction as the first valve and which is adapted upon actuation to respond to a lower actuating force than the first valve, and further including a third valve in the form of a safety valve which is operable to open and close in opposite relationship to the first valve. In this embodiment of the invention, a total of three valve functions or three switching paths can be embodied in a common valve housing.

Further objects, features and advantages of the invention will be apparent from the description hereinafter of a preferred embodiment thereof.

BRIEF DESCRIPTION OF THE DRAWING

FIG. 6 shows a view on an enlarged scale of an auxiliary valve member provided within the valve, in a closed condition, and FIG. 7 shows the valve assembly of FIG. 6 in an opened condition.

DESCRIPTION OF THE PREFERRED EMBODIMENT

Figure 1:
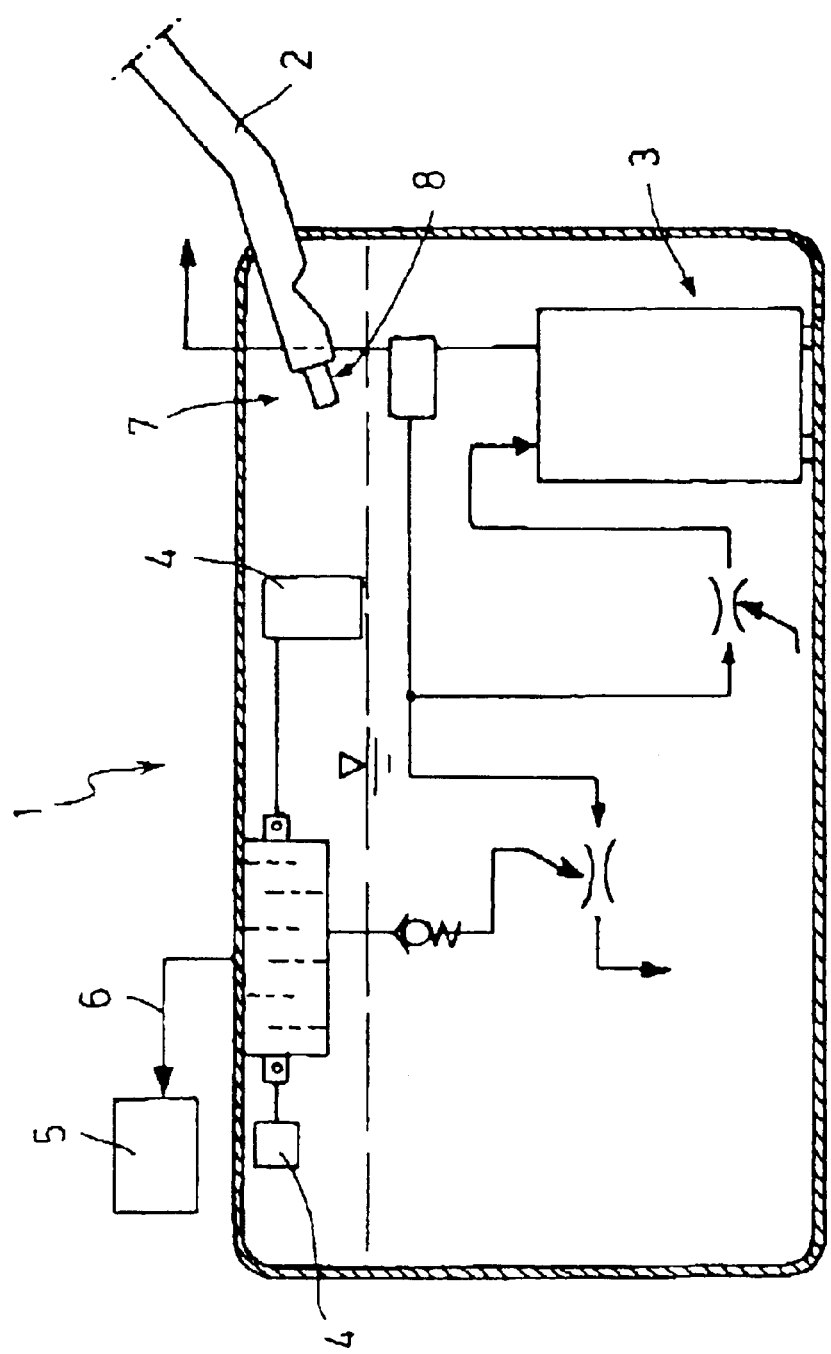
FIG. 1 is a diagrammatic view of an embodiment of a fuel tank according to the invention.

Referring firstly to FIG. 1, it can be seen therefrom that the fuel tank 1 for example for a motor vehicle, as diagrammatically illustrated therein, includes a filler pipe 2, a fuel delivery unit 3 disposed in the fuel tank 1, refuelling venting and operational venting valves 4 and a fuel vapor filter 5 which is connected by way of a venting line 6 to the venting valves 4.

The diagrammatic illustration of the fuel tank 1 and the fitments thereof is greatly simplified in the drawing, and the fitments of the tank will consequently also not be described in greater detail hereinafter as they are of a routine nature and configuration.

An outlet end 7 of the filler pipe 2 opens into the fuel tank above a level of fuel therein, as indicated by a horizontal broken line. The fuel tank according to the invention is preferably a fuel tank which is so designed as to permit what can be referred to above-level refuelling, that is to say, being a tank structure in which the outlet end 7 of the filler pipe 2 is always positioned above the maximum intended level of fuel in the fuel tank 1. It will be appreciated however that it is also possible to envisage situations of use of the invention involving sub-level refuelling, in which therefore the outlet end of the filler pipe can be below the maximum level of fuel in the fuel tank.

Disposed at least in the region of the outlet end 7 of the filler pipe 2 is a valve arrangement which is generally indicated in FIG. 1 by reference numeral 8 and which is shown in greater detail in FIGS. 2 through 7 to which reference will therefore now be made.

The valve arrangement 8 comprises a valve housing 9 which is fitted in sealing relationship into the outlet end 7 of the filler pipe 2. The valve housing 9 in the embodiment described herein comprises POM (polyoxymethylene) whereas the fuel tank and the filler pipe thereof is made from a multi-layer or laminate plastic material having at least one barrier layer for hydrocarbons. The fuel tank 1 can be produced in one piece in the usual manner as by extrusion blow molding. The valve housing 9 can be suitably fixed in the filler pipe 2, for example by being pressed into same or being secured thereto by adhesive means or welding. It will be appreciated that it is also possible to envisage the valve housing 9 being releasably connected to the filler pipe 2.

In FIGS. 2 through 7 the intake end of the respective valve arrangement illustrated is denoted by E and the outlet end by A.

Figure 2:
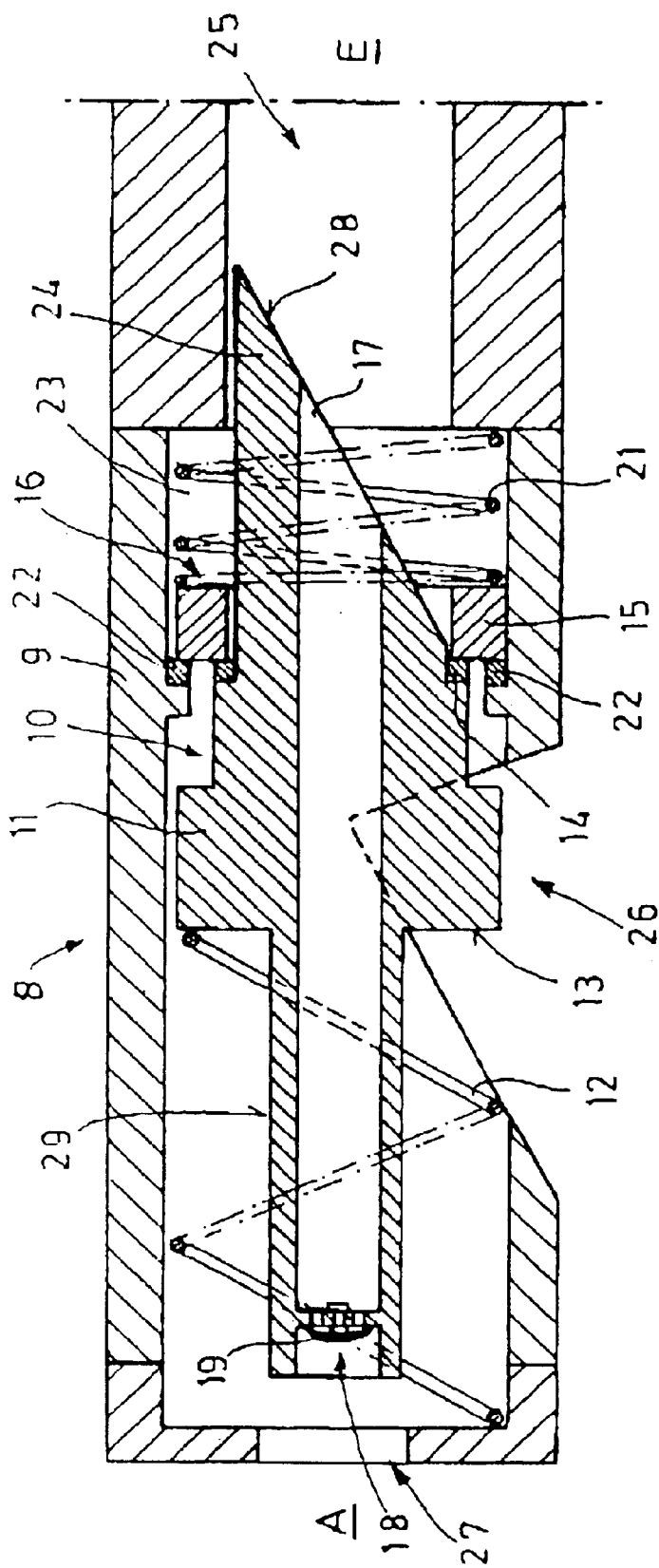
FIG. 2 is a view on an enlarged scale of a valve provided in the filler pipe of the FIG. 1 fuel tank at the outlet end thereof, in a closed condition.
Figure 3:
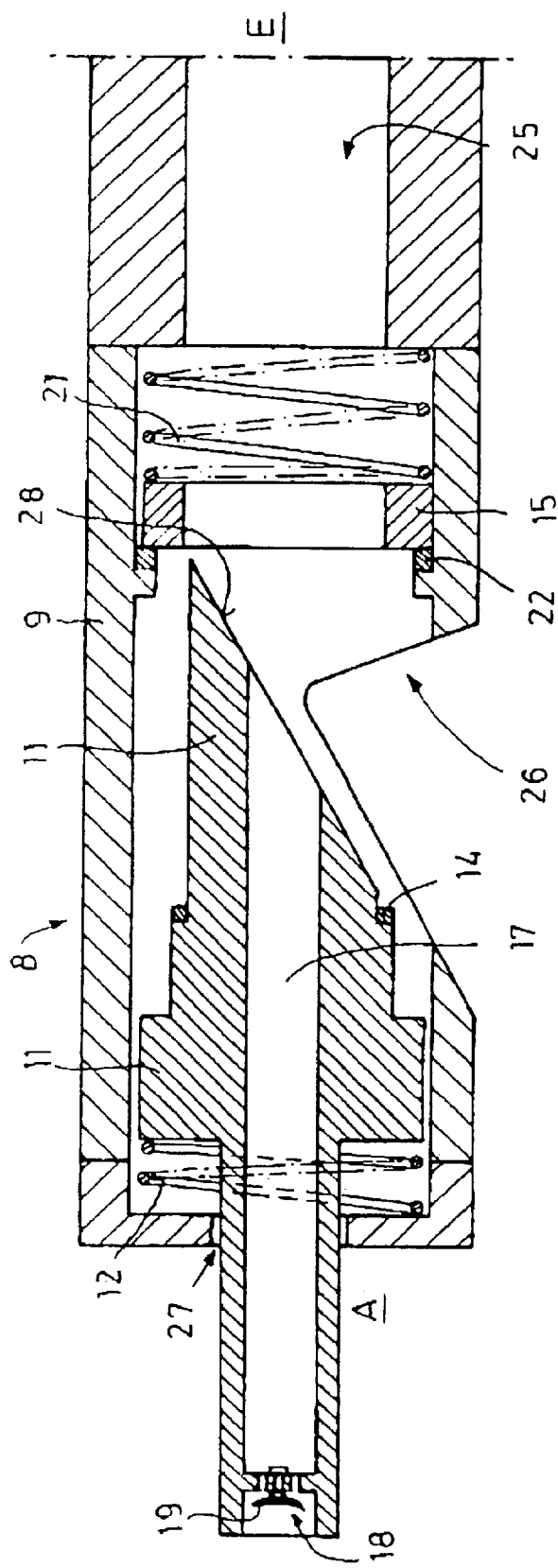
FIG. 3 shows a view of the valve illustrated in FIG. 2 in a tank refuelling operation.
Figure 4:
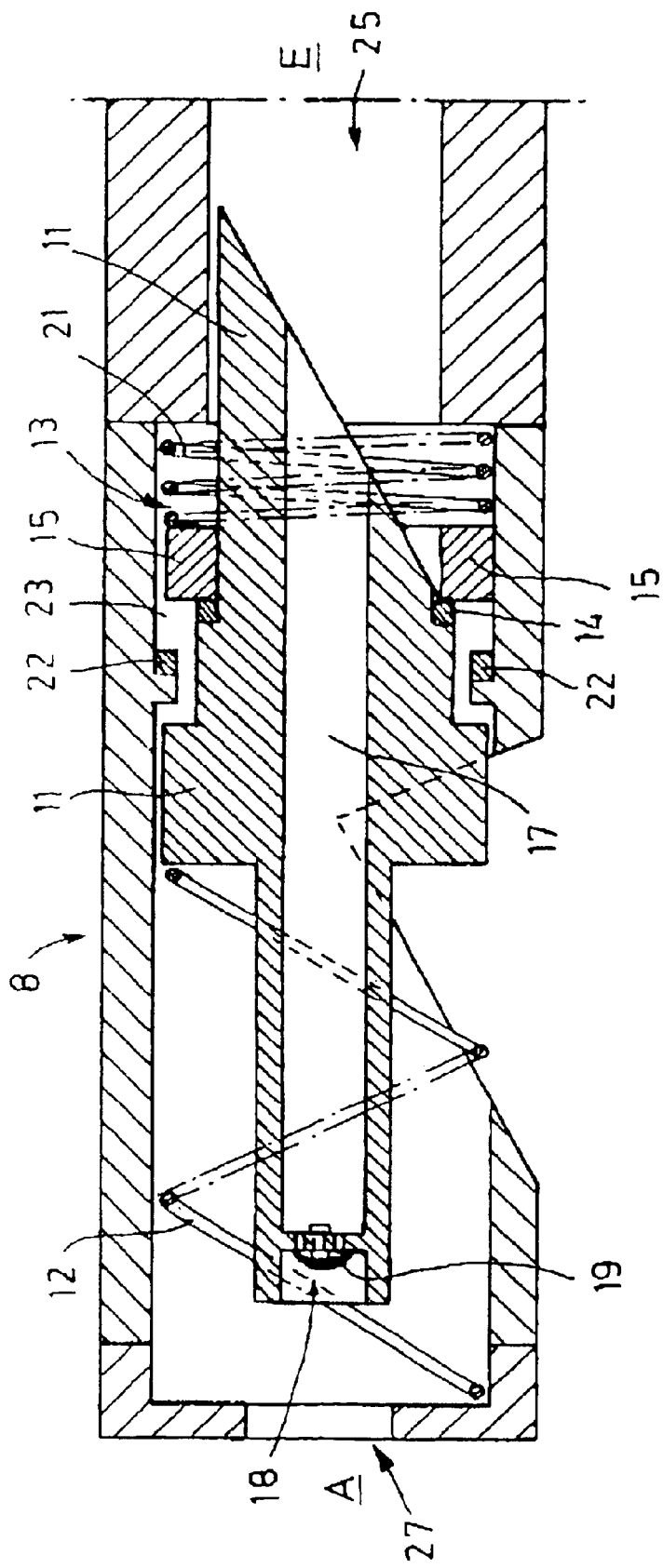
FIG. 4 shows a view of the same valve in a condition of responding as an emergency valve function.
Figure 5:
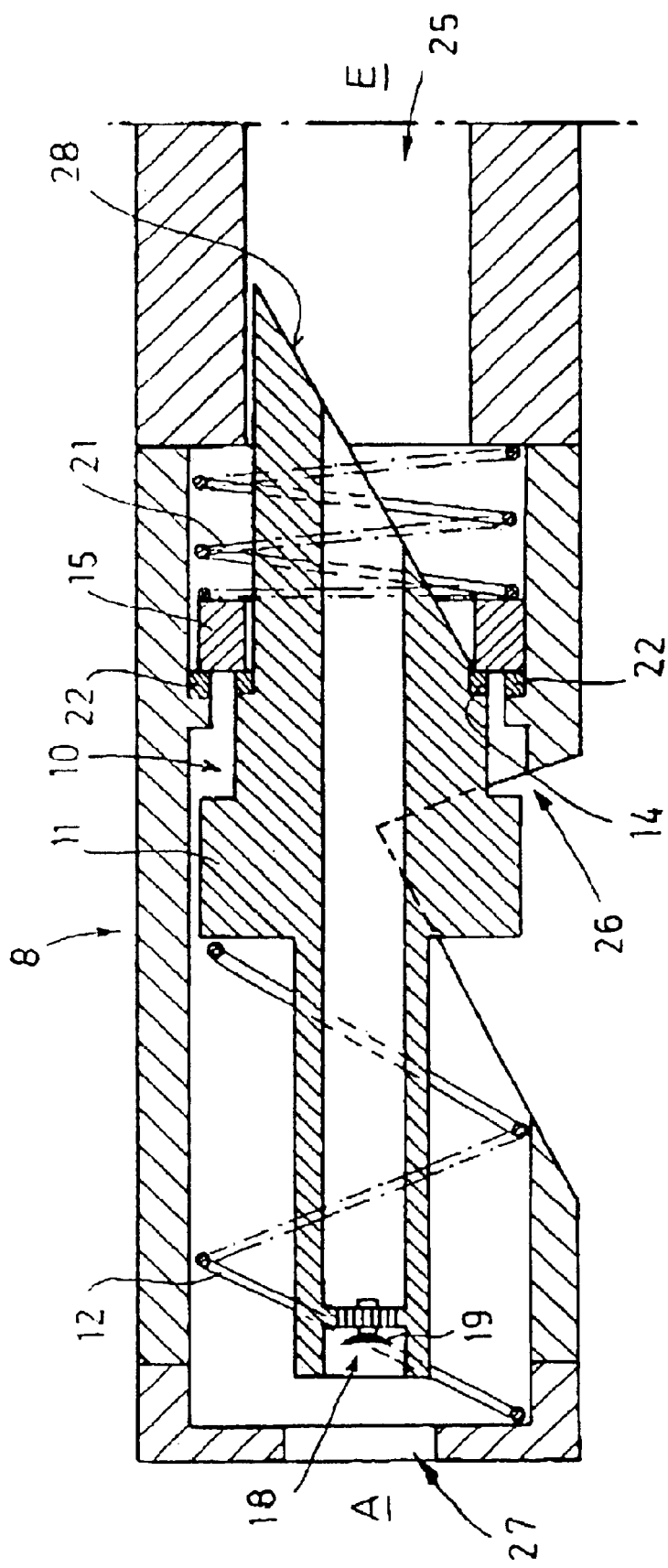
FIG. 5 shows a view of the valve in a condition of being bridged over for diagnosis purposes.

The valve housing 9 includes a first spring-loaded valve 10 which is in the form of a non-return or check valve and which in the non-actuated position as shown in FIG. 2 sealingly closes off the filler pipe 2. For that purpose, a first valve body 11 of the first valve 10 is held in a closed position by means of a first compression spring 12, acting in a direction towards the intake end E of the valve arrangement 8. The first compression spring 12 is supported on the one hand at the outlet end in the valve housing 9 and on the other hand against a corresponding support surface 13 of the first valve body 11. The first valve body 11 is in the form of a hollow-cylindrical piston which has multiple steps in its diameter and which is held with a peripherally extending sealing edge 14 against an annular valve seat in the closed position of the valve. The valve seat is in the form of a third valve body 15 of a third valve 16 which will be discussed in further detail hereinafter.

The first valve body 11, like also the valve housing 9, is provided with a through passage 17, at the outlet end of which is provided a second valve 18.

Looking now at FIGS. 6 and 7, the second valve 18 includes a second valve body 19 which is in the form of an elastomer disk or plate member. The second valve 18 opens and closes in the same direction as the first valve 10, but it opens at a markedly lower pressure difference on respective sides thereof, than the first valve 10.

In the closed position, the second valve body 19 closes a plurality of concentrically arranged passages indicated at 20.

In the opened position as shown in FIG. 7 the second valve body 19 opens the passages 20 so that the through passage 17 is opened therethrough and the entire valve arrangement 8 thus permits a free exchange of medium between the intake end of the filler pipe 2 and the outlet end 7 of the filler pipe 2. The second valve body 19 bears against the through passage 20, under a comparatively low closing force. In the normal case it will be assumed that the fuel tank 1 has an increased pressure in its interior, in relation to atmospheric pressure, so that the second valve 18 is closed.

As already mentioned hereinbefore, the third valve body 15 which is of an annular configuration forms a valve seat for the first valve body 11. The third valve body 15 is held by means of a second compression spring 21 in its closure position against a sealing step 22 which extends in the interior of the valve housing 9 around the periphery thereof. The second compression spring 21 is supported on the one hand against the third valve body 15 and on the other hand against an intake end of the valve housing 19. The second compression spring 21 is substantially stronger than the first compression spring 12.

In the closed position of the first valve 10, as shown in FIG. 2, the third valve body 15 seals off an annular space as indicated at 23 between the valve housing 9 and a first step 24 in the diameter of the first valve body 10. In that position, the first diameter step 24 of the first valve body 11 extends completely through the third valve body 15.

The third valve 16 of that design configuration opens and closes in opposite relationship to the first and second valves 10 and 18 in the event of an unacceptable increase in pressure occurring in the fuel tank 1.

The mode of operation of the valve arrangement 8 will be described hereinafter.

In normal operation of the motor vehicle, all the flow paths for fuel to pass in the valve arrangement 8 are closed. That is the condition illustrated in FIG. 2 in which all valve bodies 11, 15 and 19 are thus in a closed position. There is then no communication from an intake opening 25 of the valve housing 9 to a first outlet opening 26 and a second opening 27.

When the fuel tank is being refuelled fuel flows through the intake opening 25 of the valve housing 9 and impinges on the afflux surface 28 of the first valve body 11, which is of a bevelled configuration in a direction towards the first outlet opening 26. The first compression spring 12 is so set that the first valve body moves into its open position shown in FIG. 3 and opens the passage from the intake opening 25 of the valve housing 9 to the first outlet opening 26 thereof. In that situation fuel inevitably passes through the passage 17 of the first valve body 11 and consequently through the passages 20 into the fuel tank, with a second step 29 in the diameter of the first valve body 11 passing through the second opening 27 of the valve housing 9. The passages 20 are comparatively small so that the amount of fuel which passes therethrough into the fuel tank 1 is negligibly slight.

After the conclusion of the refuelling procedure the first and second valve bodies 11 and 19 move back into their starting position again, that is to say into the closed position.

The function of the second valve 18 is required for checking sealing integrity of the fuel tank 1 and also the filler pipe 2. As already indicated hereinbefore, it is necessary for that purpose to temporarily remove the sealing closure of the filler pipe 2, on the one hand by the valve body 11 and on the other hand by a tank cover closure (not shown), with respect to the rest of the internal volume of the tank, in order also to be able to check the sealing integrity of the filler pipe, without complicated and expensive by-pass lines or conduits. For that purpose, the fuel tank 1 is briefly subjected to the action of a reduced pressure so that a differential pressure of about 25 mbars with a fall to the interior of the fuel tank occurs at the valve arrangement 8. That comparatively minor differential pressure is sufficient to lift the second valve body 19 into the position shown in FIG. 7, the opened position being shown in exaggerated form in FIG. 7, so that the passages 20 are opened and pressure equalisation takes place between the internal volumes of the filler pipe 2 and the rest of the fuel tank. That condition is diagrammatically shown in FIG. 5. In that condition, the path from the intake opening 25 of the valve housing 9 by way of the through passage 17 to the second opening of the valve housing 9 is clear.

In the event of an unacceptable increased pressure, for example in the region of between more than 140 and 170 mbars, in the fuel tank 1, for example caused by the effect of extreme heat thereon, the pressure acting at the outlet end on the first and third valve bodies 11 and 15 causes movement of the third valve body 15 in opposition to the force of the second compression spring 21, in such a way that hydrocarbon vapors can escape into the filler pipe 2 through the annular space 23 between the third valve body 15 and the interior of the valve housing 9, and can possibly escape to the atmosphere through an emergency venting valve provided in the cover closure.

For that purpose, it is possible to provide in the internal wall of the valve housing 9 and/or in the third valve body 15 flow transfer ducts or the like which are opened upon movement of the third valve body 15 into the opened position. These details are not illustrated in the drawing but will be self-evident from the present context.

It will be appreciated that the above-described embodiment of the invention has been set forth solely by way of example and illustration of the principles of the present invention and that further modifications may be made therein without thereby departing from the spirit and scope of the present invention.

What is claimed is:

1. A fuel tank for a motor vehicle, comprising
   means for delivering fuel from the fuel tank to an engine,
   means for the introduction of air into and the venting of air from the tank,
   a filler pipe having a closable intake end and an outlet end with a mouth opening into the interior of the tank,
   at least one first valve disposed in the region of the outlet end of the filler pipe and adapted to sealingly close at least in relation to a fuel blowback,
   at least one second valve which is disposed in the filler pipe at least in the region of the outlet end thereof and adapted for bridging over the first valve, and
   a third valve in the form of a safety valve openable and closable in opposite relationship to the first valve.

2. A fuel tank as set forth in claim 1
   wherein the second valve is a valve which is operable to open and close in the same direction with the first valve and which is adapted upon actuation to respond to a lower actuating force than the first valve.

3. A fuel tank as set forth in claim 1
   wherein the first valve has a valve body and
   wherein the second valve is disposed in the valve body of the first valve.

4. A fuel tank as set forth in claim 1
   wherein the first valve is in the form of a spring-loaded non-return valve.

5. A fuel tank as set forth in claim 1 wherein the first valve includes a valve body having a passage therethrough and wherein the second valve includes a resilient plate member which in the non-actuated condition of the second valve closes the passage through the valve body of the first valve.

6. A fuel tank as set forth in claim 1 wherein the second valve is designed to be openable at a differential pressure with a fall to the interior of the tank of between about 5 and 20 mbars.

7. A fuel tank as set forth in claim 1 wherein the second valve is in the form of a safety valve which is openable and closeable in the opposite direction to the first valve.

8. A fuel tank as set forth in claim 7 wherein the second valve is in the form of a spring-loaded valve.

9. A fuel tank as set forth in claim 7 wherein the first valve has a valve body, and the second valve has a valve body as a sealing seat for the valve body of the first valve.

10. A fuel tank as set forth in claim 7 wherein the first and second valves include a common valve housing and the first and second valves include a respective valve body, the first and second valve bodies being disposed in the common valve housing.

11. A fuel tank as set forth in claim 10 wherein the valve body of the second valve is of an annular configuration and in a closed position seals off an annular space between the valve body of the first valve and the valve housing, and wherein the valve body of the first valve at least in the closure position thereof engages into the valve body of the second valve.

12. A fuel tank as set forth in claim 10 wherein the valve body of the second valve is of an annular configuration and in a closed position seals off a by-pass between the valve body of the first valve and the valve housing, and wherein the valve body of the first valve at least in the closure position thereof engages into the valve body of the second valve.

13. A fuel tank as set forth in claim 10 wherein the valve body of the second valve is of an annular configuration and in a closed position seals off an annular space between the valve body of the first valve and the valve housing, and wherein the valve body of the first valve at least in the closure position thereof extends through the valve body of the second valve.

14. A fuel tank as set forth in claim 10 wherein the valve body of the second valve is of an annular configuration and in a closed position seals off a by-pass between the valve body of the first valve and the valve housing, and wherein the valve body of the first valve at least in the closure position thereof extends through the valve body of the second valve.

15. A fuel tank as set forth in claim 1 wherein the third valve includes a valve body in the form of a sealing seat for the valve body of the first valve.

16. A fuel tank as set forth in claim 1 including a common valve housing for the first and second valves, wherein the first and second valves have respective valve bodies arranged in the common valve housing.

17. A fuel tank as set forth in claim 1 wherein the valve body of the third valve is of an annular configuration and in a closed position seals off an annular space between the valve body of the first valve and the valve housing, and wherein the valve body of the first valve at least in the closure position thereof engages into the valve body of the third valve.

18. A fuel tank as set forth in claim 1 wherein the valve body of the third valve is of an annular configuration and in a closed position seals off a by-pass between the valve body of the first valve and the valve housing, and wherein the valve body of the first valve at least in the closure position thereof engages into the valve body of the third valve.

19. A fuel tank as set forth in claim 1 wherein the valve body of the third valve is of an annular configuration and in a closed position seals off an annular space between the valve body of the first valve and the valve housing, and wherein the valve body of the first valve at least in the closure position thereof extends through the valve body of the third valve.

20. A fuel tank as set forth in claim 1 wherein the valve body of the third valve is of an annular configuration and in a closed position seals off a by-pass between the valve body of the first valve and the valve housing, and wherein the valve body of the first valve at least in the closure position thereof extends through the valve body of the third valve.

21. A fuel tank as set forth in claim 1 wherein the outlet end of the filler pipe opens into the fuel tank above the planned maximum level of fuel therein.

22. A fuel tank for a motor vehicle, comprising
means for delivering fuel from the fuel tank to an engine,
means for the introduction of air into and the venting of air from the tank,
a filler pipe having a closable intake end and an outlet end with a mouth opening into the interior of the tank,
at least one first valve disposed in the region of the outlet end of the filler pipe and adapted to sealingly close at least in relation to a fuel blowback,
at least one second valve which is disposed in the filler pipe at least in the region of the outlet end thereof and adapted for bridging over the first valve,
wherein the second valve is in the form of a safety valve which is openable and closeable in the opposite direction to the first valve,
wherein the first and second valves include a common valve housing and the first and second valves include a respective valve body, the first and second valve bodies being disposed in the common valve housing,
wherein the valve body of the second valve is of an annular configuration and in a closed position seals off a by-pass between the valve body of the first valve and the valve housing, and wherein the valve body of the first valve at least in the closure position thereof engages into the valve body of the second valve.

* * * * *